(12) United States Patent
Dragone

(10) Patent No.: US 8,326,101 B2
(45) Date of Patent: Dec. 4, 2012

(54) OPTICAL ROUTER WITH NEARLY IDEAL PERFORMANCE AND INCREASED NUMBER OF CHANNELS

(76) Inventor: Corrado Pietro Dragone, Little Silver, NJ (US)

( * ) Notice: Subject to any disclaimer, the term of this patent is extended or adjusted under 35 U.S.C. 154(b) by 332 days.

(21) Appl. No.: 12/804,052

(22) Filed: Jul. 13, 2010

(65) Prior Publication Data

US 2012/0014644 A1 Jan. 19, 2012

(51) Int. Cl.
*G02B 6/26* (2006.01)
*G02B 6/42* (2006.01)
*G02B 6/34* (2006.01)

(52) U.S. Cl. ............... 385/46; 385/16; 385/17; 385/27; 385/37; 385/39

(58) Field of Classification Search ............ 385/46
See application file for complete search history.

(56) References Cited

U.S. PATENT DOCUMENTS

| | | |
|---|---|---|
| 5,002,350 A | 3/1991 | Dragone |
| 5,136,671 A | 8/1992 | Dragone |
| 5,488,680 A | 1/1996 | Dragone |
| 6,873,766 B2 | 3/2005 | Dragone |
| 7,043,123 B2 | 5/2006 | Doerr |
| 7,068,888 B1 | 6/2006 | Dragone |
| 7,283,700 B2 * | 10/2007 | Dragone ............ 385/24 |

* cited by examiner

*Primary Examiner* — Uyen Chau N Le
*Assistant Examiner* — Kajli Prince

(57) ABSTRACT

An optimized planar optical router consisting of two stages performing stationary imaging between an input waveguide and a set of output waveguides has advantages of reduced size, larger number of channels and minimal loss variation in each passband. The new router is an optimized M×N imaging arrangement including two waveguide gratings and n waveguide lenses connected between the principal zones of the two gratings. The largest values of N are realized by using a combination of two techniques that increase N without increasing the size of the two gratings. One technique increases N for a given number n of lenses and, the other, increases n. In one embodiment, each lens produces a periodic sequence of passbands, all transmitted from a particular input waveguide to the same output waveguide, whereas, in a second embodiment, the above passbands are transmitted to different output waveguides. In both cases, the loss caused by secondary images is substantially reduced by including secondary lenses.

6 Claims, 10 Drawing Sheets

FIGURE 2 *(Prior Art)*

OPTICAL ROUTER WITH NEARLY IDEAL PERFORMANCE AND INCREASED NUMBER OF CHANNELS

FIELD OF THE INVENTION

This invention relates to optical frequency routers in optical systems and, more particularly, to optical routers with maximally flat passbands.

BACKGROUND OF THE INVENTION

An important function that must be provided in optical networks is wavelength routing. In particular, wavelength routing is needed at each node, in order to combine and separate different wavelength channels. Typically, the router is realized in integrated form by using a waveguide grating, and an example is shown in FIG. 1. The router in this example only includes one input waveguide and its purpose is to separate the input channels, and transmit them to different output waveguides. The waveguide grating simply transforms each input signal, intended for a particular output waveguide, into a corresponding output image produced (approximately) at the output waveguide location. However, an undesirable feature of this router is its narrow bandwidth, caused by the strong wavelength dependence of each image location produced by the grating. Because of this variation, maximum transmission to each output waveguide is only realized in the immediate vicinity of the center wavelength of maximum transmission for that waveguide.

In order to solve this problem, one must use a planar arrangement of two gratings of opposite dispersions as shown previously in U.S. Pat. No. 5,488,680 which issued on Jan. 30, 1996, U.S. Pat. No. 7,043,123 B2 which issued on May 9, 2006, and U.S. Pat. No. 7,283,700 B2 Oct. 16, 2007. By this technique, the router produces, at the location of each output waveguide, a stationary image producing a maximally flat transmission coefficient. However, an undesirable feature of both patents is the large size of the router. In particular, the second patent requires between the two gratings several waveguide lenses, one for each output waveguide and, as a consequence, this arrangement is only feasible if the number of lenses is small. As shown in FIG. 3 this arrangement consists of two stages 311 and 312 (two waveguide gratings) interconnected by a set 313 of N waveguide lenses 328. The waveguide lenses are connected between the focal circles 323 and 324 of the two stages. On the output focal circle 324, the N lenses are separated by small gaps, thus producing N separate images, respectively transmitted to the N output waveguides 308. By using this technique, a 1×5 router was demonstrated with excellent results. However, an undesirable feature of this router is the large size of each stage. This is partly caused by the large number of waveguides (typically about 10) in each lens, resulting in a large increase in number of arms in each grating, by at least a factor of 3 as compared to a conventional waveguide grating router (shown in FIG. 1). Moreover, the router of FIG. 3 only includes one input waveguide and, as shown later, it is not periodic. Accordingly, here both size and performance are substantially improved, and a new M×N router featuring increased number of passbands and improved performance is described.

SUMMARY OF THE INVENTION

The primary objective of the present invention is the realization of an optical router with improved transmission properties, reduced size, increased number of channels and maximally flat passbands. The new router is an optimized M×N imaging arrangement including two waveguide gratings and several waveguide lenses connected between the principal zones of the two gratings. The largest values of N are realized by using a combination of two techniques that increase N without increasing the size of the two gratings. The first technique is realized by including in the router design several cycles of the input stage, and the value of N can then be increased by a factor r determined by the number of cycles. By the second technique, the loss caused by secondary images is substantially reduced by including, between the two gratings, secondary lenses connected outside the principal zones of the two gratings, thus substantially increasing the number n of principal lenses that can be connected with negligible loss between the two principal zones.

Important applications include a M×N router with N=nr, an N×N router featuring a total of $N^2$ connections and a periodic N×N router with n=2N−1.

DETAILED DESCRIPTION OF VARIOUS ILLUSTRATIVE EMBODIMENTS

In the following description, each element is represented by a number whose first part represents the Figure number and, the remaining part, is the element designation. Therefore identical element designations in different figures represent identical elements (e.g., 108 is the element 08 located in FIG. 1).

Waveguide Grating Router

Figure 1:
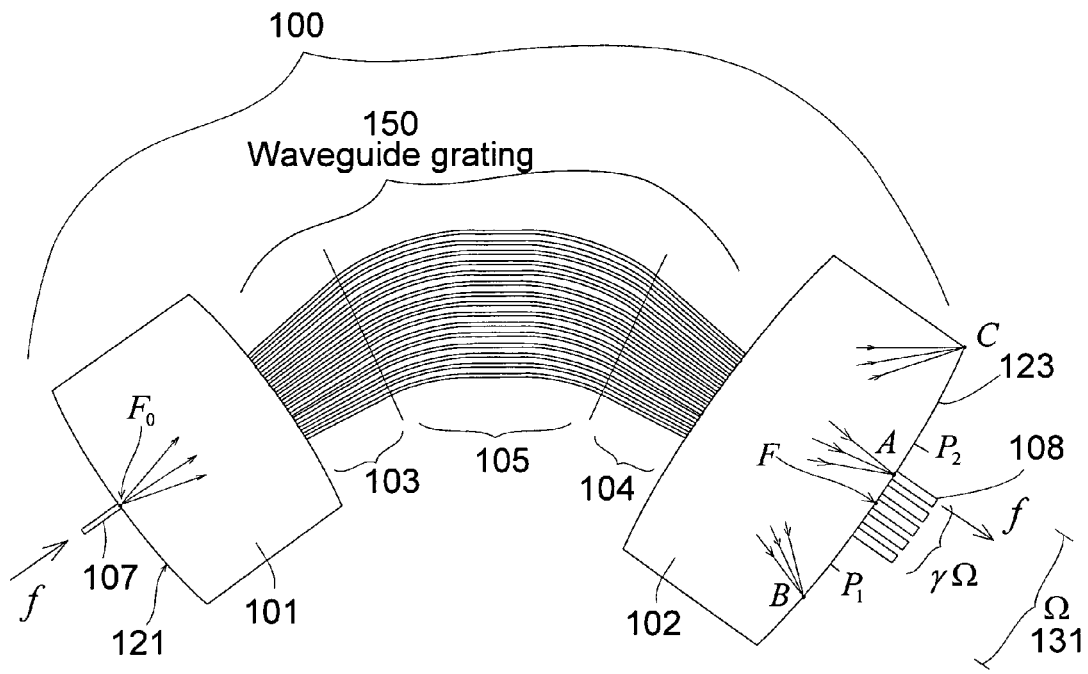
FIG. 1 illustrates the basic prior art geometry of a waveguide grating router.

FIG. 1 shows the basic structure of a prior art imaging arrangement 100 of the type used in this invention. Note the imaging arrangement will also be referred to herein as a router. The imaging arrangement 100 is described in U.S. Pat. No. 5,002,350, issued on Mar. 26, 1991, and U.S. Pat. No. 5,136,671, issued on Aug. 4, 1992, The imaging arrangement 100 includes an input section 101 and an output section 102 spaced apart and interconnected by a grating 150 consisting of an appropriate plurality of optical waveguide arms 105 connected between two periodic arrays 103,104 of radial waveguides. The input and output sections typically are each free-space slabs, such as star couplers, and the arrangement has the property that wave energy applied by an input waveguide 107 acting as a point source forms a plurality of output images, of which three are shown as A, B, C in FIG. 1. The optical waveguide arms 105 typically are thin narrow layers (planar strips) of silica core supported on a planar silicon wafer, as known in the art.

In a conventional imaging arrangement or router, the input and output ports are connected to the input and output sections 101 and 102 along portions of two curves, that contain the input and output foci $F_0$ and $F$, and they are typically referred to as the input 121 and output 123 focal circles. For simplicity, FIG. 1 shows only one input 107 and several output 108 ports.

The result is a router that produces a frequency dependent output image of each input signal. The location of each output image is determined by its frequency f and, therefore, signals of different frequencies from a particular input port give rise to separate images that can be received by different output ports. Typically, optical fibers are used for applying input signals to the input ports and for extracting output signals from the output ports 108. Several output ports are needed in order to transmit signals to different destinations. Similarly, several input ports may be needed, in order to receive signals from different input fibers. In frequency division optical networks, the different frequencies would represent different communication channels.

The properties of the arrangement of FIG. 1 are best described next by considering its imaging properties in response to an input signal of variable frequency f applied to the input waveguide 107. The input signal in FIG. 1 is radiated from the waveguide location towards the receiving apertures of the radial waveguides 103 connected to the arms 105 forming the grating 150. As discussed earlier, there would be an appropriate number of arms in the grating 150. At a particular input frequency, each arm receives a component of the input signal. The signal is therefore split into many components, each traveling along a particular arm. Each arm applies to its component an appropriate phase shift, which is frequency dependent, and it is proportional to the optical path length of the arm. In a conventional router, successive arms are characterized to a good approximation by a constant path length difference. Then, one finds that the various signal components radiated by the arms towards the output curve, all add in phase at certain locations on the output curve 123 shown in FIG. 1. As a result, several images A, B, C of the input signal are produced on the output curve 123. These images represent different orders of the grating and they have three basic properties. First, their locations vary with the frequency f. Second, their intensities also vary, and they are determined by the radiation characteristics of the periodic array 104. Third, the images are equally spaced with spacing $\Omega$ determined by the angular spacing a of the array elements, $$\Omega = \frac{\lambda}{\alpha} = \frac{c}{f} \frac{1}{\alpha} \tag{1}$$

where $\lambda$ denotes the wavelength, approximately equal to a constant c divided by f. Of greatest importance in a conventional router is the principal image A of highest intensity. This is the image closest to the focal point F of the arms and it is called the principal image. This image is produced inside the principal zone, which is an interval 131 of width $\Omega$ centered at F. The remaining images (produced by different orders) such as B, C are produced outside the principal zone. These secondary images typically have appreciably smaller intensity in all cases except when they are close to the boundaries of the principal zone. In a conventional router, all secondary images produced outside the principal zone (e.g., B and C of FIG. 1) are considered useless and so undesirable. These unwanted images reduce the power transferred to the principal image and, therefore, they reduce the grating efficiency. In particular, they cause substantial efficiency variation in the principal zone $P_1P_2$, particularly in the regions close to the edges $P_1$ and $P_2$. As a consequence, in conventional routers, the output waveguides 108 are located in the central region where the grating efficiency is close to unity.

By using two previous techniques, respectively described in U.S. Pat. No. 7,068,888 issued on Jun. 27, 2006, and U.S. Pat. No. 6,873,766 issued on Mar. 29, 2005, the grating efficiency can be substantially improved by including suitable transitions in the output periodic array 104. By using the first technique, the above central region (characterized by nearly unity efficiency) can be increased to more than 50% of the principal zone and, by adding the second technique, it can be increased to about 80%. On the other hand, both techniques increase the output focal length of the router.

Note, since the principal image A is defined as the closest image to the focal point, the principal zone width $P_1P_2$ is simply equal to the spacing $\Omega$ of the various images. Moreover, an input signal of variable frequency will cause the principal image location to vary cyclically in the principal zone, with a discontinuous jump by $-\Omega$ occurring from each cycle (each order) to the next.

In a conventional router, all the output ports or waveguides are located inside the principal zone 131 (which in FIG. 1 represents the field of view $P_1P_2$ of the router) and receive only the images produced in the central zone. As shown in FIG. 1, the output waveguides 108 are closely spaced, with spacing S slightly larger than the waveguide width w. Note the waveguide spacing determines in FIG. 1 the channel spacing, and it is therefore important to minimize S for a given waveguide width w by choosing for S the smallest possible value, without causing appreciable mutual coupling (crosstalk) between adjacent waveguides.

The input signal in FIG. 1 is efficiently transmitted to a particular waveguide at those frequencies for which the principal image location A coincides with the waveguide location. As pointed out earlier, A is defined as the particular image inside the principal zone $P_1P_2$. Therefore the variation of A is a periodic (cyclic) function of the signal frequency. In each period, the variation exactly covers the entire principal zone $P_1P_2$. As a result, the transmission coefficient (to a particular output waveguide) has periodic behavior consisting of equally spaced maxima. Each maximum corresponds to a frequency for which the image A coincides with the output waveguide location. The period Df, determined by the frequency spacing between maxima, is called the free-spectral range. The period Df has, in general, slightly different values at different locations in the principal zone and, therefore, different waveguides in FIG. 1 will be characterized by slightly different periods. Consider for instance the central period produced, at the center (the focal point F) of the principal zone, in response to a signal applied to $F_0$. Then, a waveguide connected to the focal point F is characterized by a set of equally spaced frequencies $f_i$ of maximum transmission. Each of these frequencies is determined by a particular order $Q_i$ the grating, and $$f_i = f_0 + iDf, Q_i = Q_0 + i (i=0, \pm 1, \dots) \tag{2}$$

where $f_0$ will be called the center frequency of the grating, $Q_0$ denotes the corresponding order, Df will be called the free-spectral range of the router, and the frequencies $f_i$ will be referred to as the characteristic frequencies of the router. Moreover, the parameters Df, $f_0$, $Q_0$ are related by the well known relation $$Df = \frac{f_0}{Q_0} = \frac{f_i}{Q_i} \tag{3}$$

Another important relation is obtained by considering in FIG. 1 the variation of the output image A as a function of the wavelength. One finds that the wavelength derivative D of the image coordinate is simply equal to $$D = Q \frac{\Omega}{\lambda} \tag{4}$$

where Q is the order of the image and the ratio $\Omega/\lambda$ according to the expression (1) is a constant independent of the signal frequency.

Figure 2:
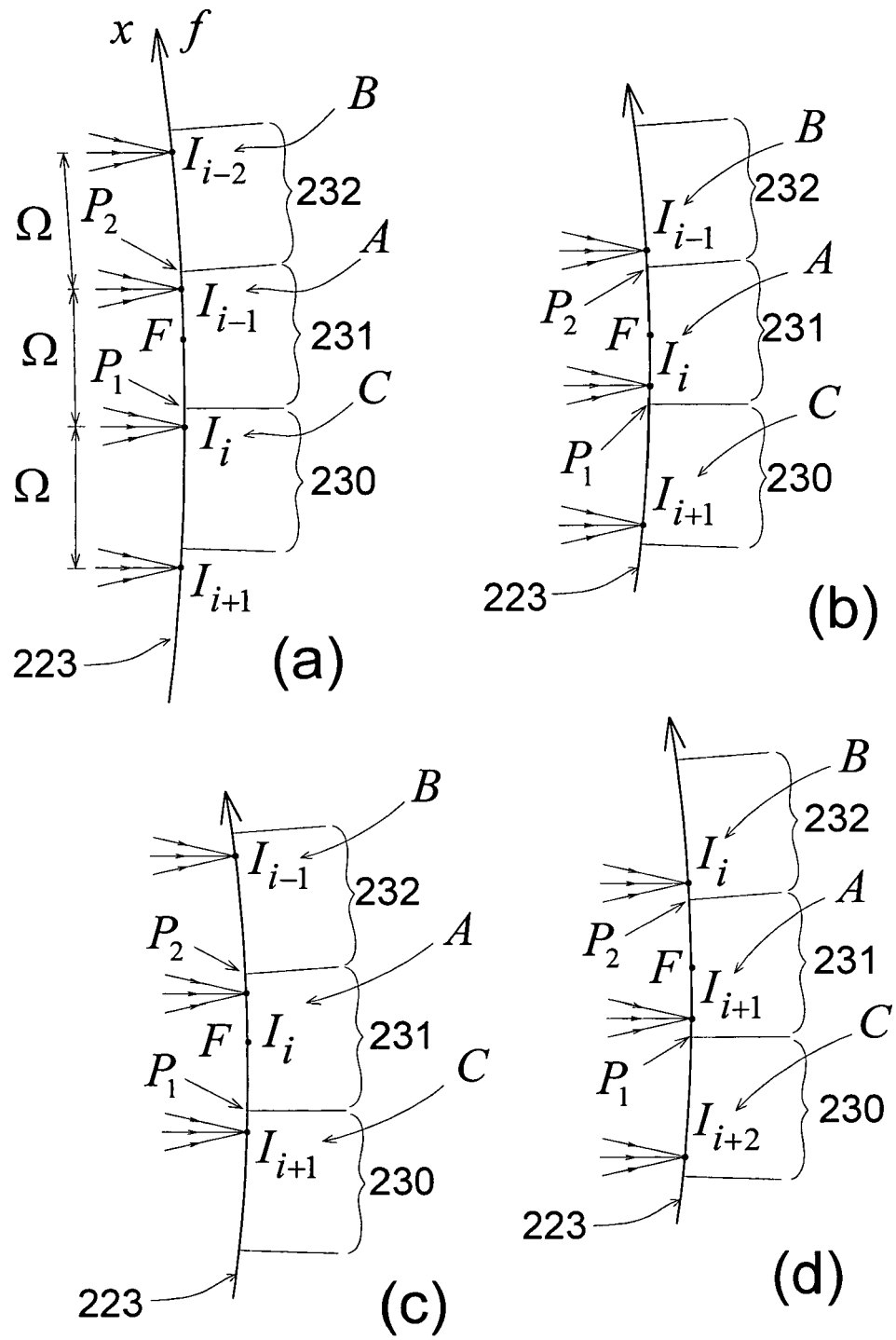
FIG. 2 illustrates the cyclic behavior of the images A, B, C produced in the output zones 230, 231 and 232 of a waveguide grating router.

Next consider the router response to an input signal of variable frequency. FIG. 2 shows four examples (a, b, c, d) of the images respectively produced on the output circle 223 by four consecutive frequencies. Note $I_i$ denotes the i-th image of order $Q_i$ and $\Omega$ is the image spacing determined by the angular period $\alpha$ of the periodic array 104. Typically, by optimizing the efficiency of the periodic array 104, most of the signal power is transferred to the principal image A located in the principal zone 231, and the remaining power is primarily transferred to the two secondary images located on either side of the principal zone. These three images are respectively located inside three zones 230, 231, and 232 of widths equal to $\Omega$ and they are characterized, in each zone, by cyclic variation. Each cycle is produced by a particular image, of a particular order, and it covers the entire zone. Consider for instance the principal zone 231. Initially, in insert (a), the principal image A inside the principal zone $P_1P_2$ is produced by the image $I_{i-1}$ of order $Q_{i-1}$, and the image $I_i$ of order $Q_i$ is a secondary image C produced inside the secondary zone 230. However, by increasing the frequency, the image $I_{i-1}$ exits the principal zone, thus becoming a secondary image B in the secondary zone 232 as shown by insert (b). At the same time, the secondary image $I_i$ enters the principal zone, thus becoming the new principal image A. Notice, at the end of each cycle, produced by a particular order, the principal image exits from the principal zone at $P_2$ while at the same time a new cycle starts at $P_1$ (see inserts (c, d)). Thus, at the end of each cycle, the principal image A discontinuously jumps from $P_2$ to $P_1$, and a similar behavior occurs in all other zones.

To summarize, the image location in the principal zone $P_1P_2$ is a cyclic function of the input frequency. Each cycle is determined by a particular order $Q_i$ of the grating and it covers the entire interval $P_1P_2$. At the end $P_2$ of a cycle, the order $Q_i$ increases by one (thus becoming $Q_{i+1}=Q_i+1$) and a new cycle starts at the other end $P_1$. Notice, any particular location A in the principal zone $P_1P_2$ is periodically revisited by the output image with a constant frequency period Df.

Stationary Imaging

In FIG. 1, the location of each output image is a function of the input frequency, and therefore the router is characterized by substantial loss variation in each passband. It is therefore desirable for many applications to substantially reduce this variation by using the technique described in U.S. Pat. No. 5,488,680 which issued on Jan. 30, 1996, U.S. Pat. No. 7,043,123 B2 which issued on May 9, 2006, and U.S. Pat. No. 7,283,700 B2, which issued on Oct. 16, 2007. By this technique, the above image variation is essentially eliminated by using a combination of two stages characterized by opposite dispersions, and the router then produces, at each output waveguide location, a stationary output image producing a maximally flat response in the output waveguide. However, a limitation of the arrangements described in the above patents is their large size. In particular, the arrangement proposed in U.S. Pat. No. 7,043,123 B2 and shown in FIG. 3 requires n waveguide lenses, one for each output waveguide 308, and therefore this arrangement is only feasible if the number of output waveguides is small. On the other hand, U.S. Pat. No. 7,283,700 describes an arrangement using a single lens, but an undesirable feature of this arrangement is again its large size, caused in this case by the large spacing of the output waveguides.

The main properties of the prior art router of FIG. 3 can be summarized as follows. The router is a combination of two stages 311, 312 (two waveguide grating routers) with a set 313 of n principal lenses 328 interconnected between the principal zones 341 and 342 of the two stages 311 and 312. Each stage performs cyclic (periodic) imaging, but only one cycle (a particular order of the grating) is used in each stage. Thus, the router transmission coefficients are all produced by a particular order $Q_0$ of the first stage. The first stage is connected to an input waveguide, and its output response to an input signal of variable frequency is a variable image A, produced in the output principal zone 341 of the first stage. The purpose of the n lenses is to produce n transmission coefficients, each transmitted to a particular output waveguide 308. Thus, the frequency variation of the image A is split by the n lenses into n separate frequency intervals (passbands), each producing an output image located inside the output aperture of a particular lens 328, and the output stage then produces, in the output principal zone 333 of the router, a set of n stationary images, respectively produced at the locations of the n output waveguides.

Main limitations of this router are that (1) the number N of output waveguides is equal to the number n of lenses, (2) each stage is substantially larger than a conventional router and (3) only one input waveguide is included. In this patent application, the first two limitations are removed by using a combination of two techniques, that increase N without increasing the size of the router. One technique increases N for a given n, and the other technique increases n. Also, in one embodiment, a periodic N×N router performing $N^2$ connections is realized by choosing $Q'_0=Q_0$.

Next, let a prime ( )' denote the parameters of the second stage, and let $\Omega$, $\Omega'$ be the widths of the principal zones 341, 342 of the two stages. Also assume for simplicity that the lenses are characterized by unity magnification, so that the input and output apertures of each lens have the same width W (and therefore they are characterized by the same waveguide spacing) on the input and output circles 323, 324 of the two stages. Similarly, assume that each stage is characterized by unity magnification, so that the input and output zones of each stage have the same width. A consequence of this assumption is that the spacing S of the output waveguides is simply equal to the gaps S between the output apertures of the lenses. Note the above magnifications (of the lens and the two stages) do not affect the router performance. They are only assumed to simplify the design formulation. Then, a simple expression is obtained for the wavelength derivative of each output image. By assuming unity magnifications, this derivative becomes equal to the difference D'−D, where the two parameters D and D' are the contributions from the two stages, and D is given by expression (4). Stationary imaging is therefore realized by simply specifying D'=D and one obtains the condition $$\frac{\Omega}{\Omega'} = \frac{Q'_0}{Q_0} \qquad (5)$$

where $\Omega/\Omega'$ is according to Equation (1) a constant, independent of the frequency.

Figure 3:
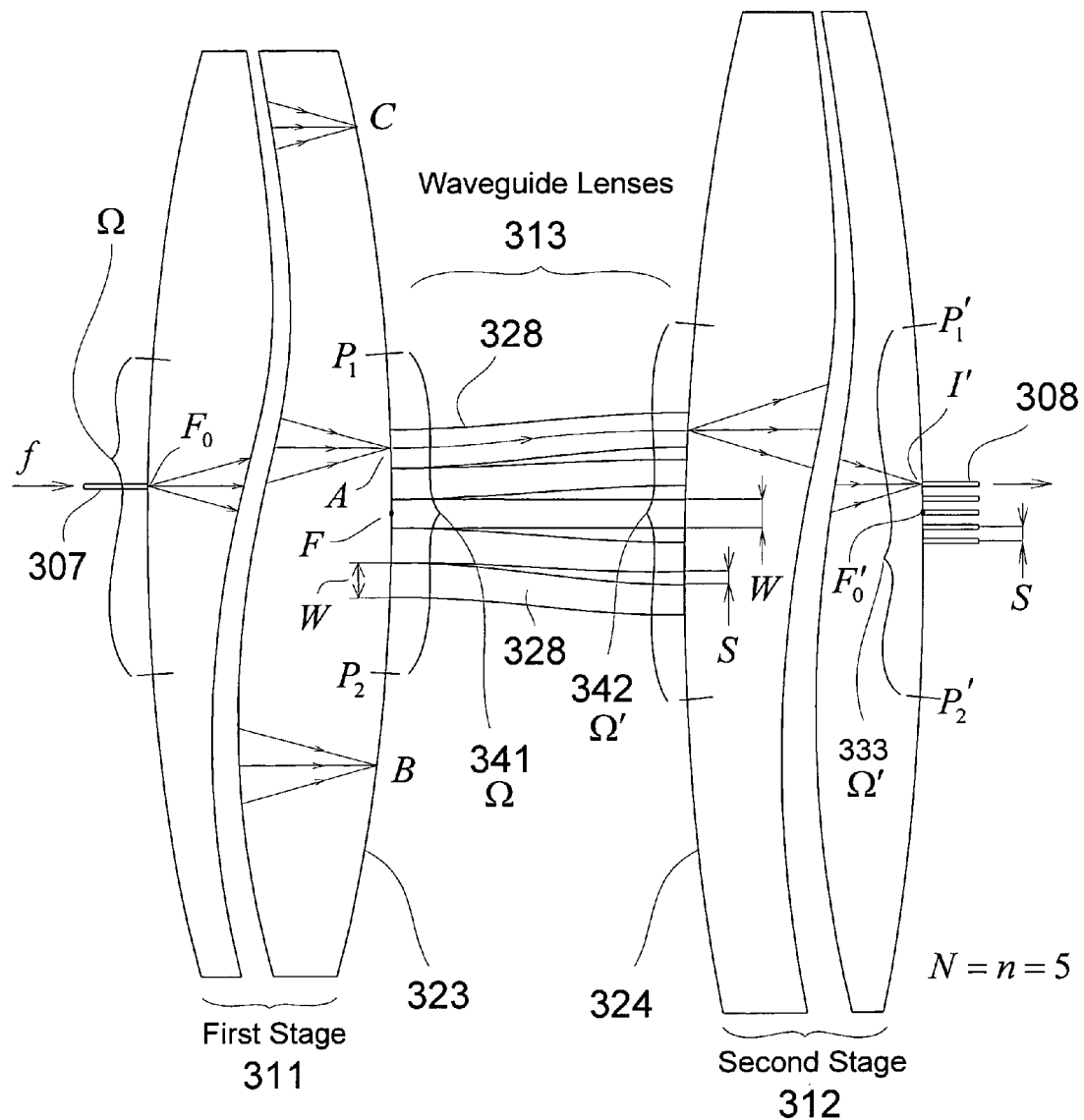
FIG. 3 shows a prior art 1×n router consisting of two stages 311 and 312 (two waveguide grating routers) interconnected by a set 313 of n waveguide lenses 328.
Figure 4:
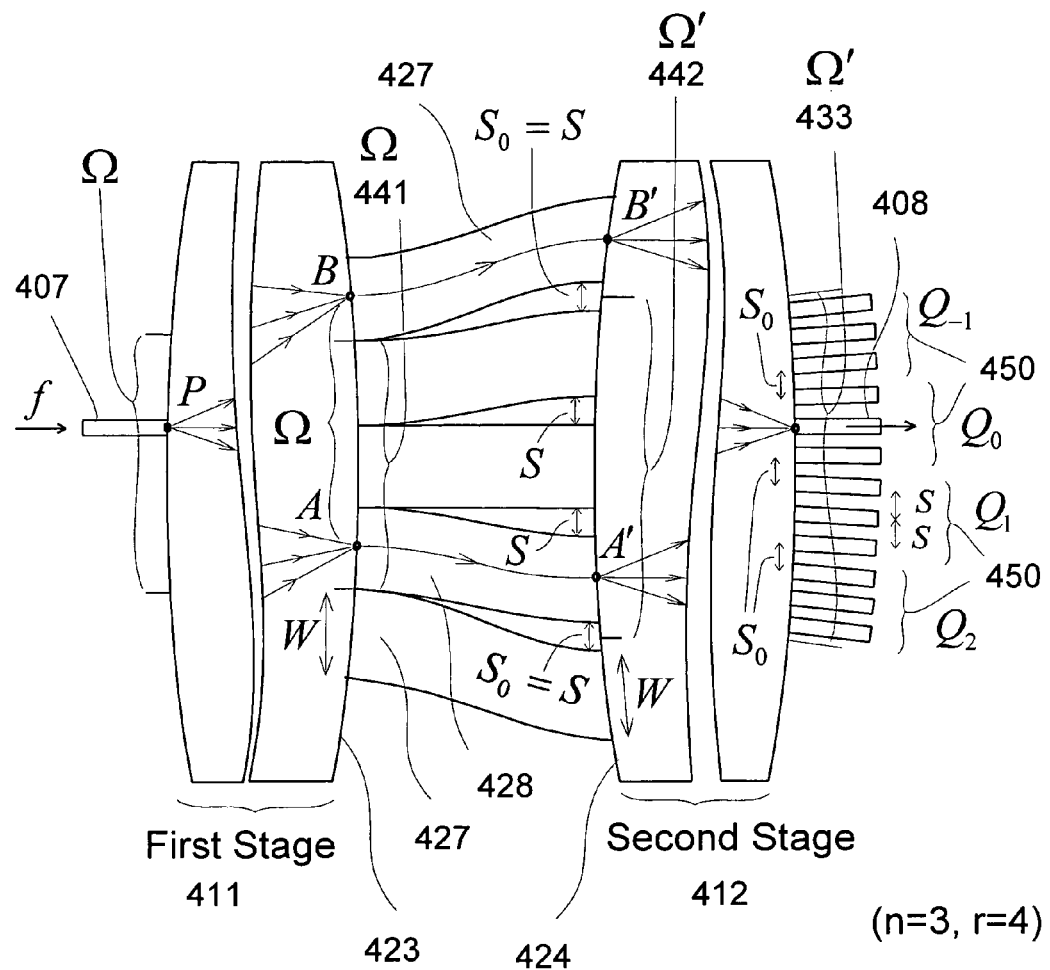
FIG. 4 shows the basic router geometry of the present invention. The router includes several sets 450 of output waveguides, the number of sets is r=4 and the number of waveguides in each set is equal to the number n of principal lenses 428. Moreover, secondary lenses 427 are included, and the total number of output waveguides is N=rn.

FIG. 4 shows a first embodiment of this patent. As compared to the prior art arrangement of FIG. 3, the main differences in FIG. 4 are the following two features.

First, several cycles (of different orders $Q_i$) are now included in the router design. Second, the router now includes, between the two stages, secondary lenses 427 connected outside the principal zones 441 and 442 of the two stages.

The first feature substantially increases N. Indeed, by using r cycles of the input stage, the number N of output waveguides in FIG. 4 is increased by a factor r, and one obtains $$N=nr \qquad (6)$$

whereas N=n in the prior art.

The second feature increases n. Indeed, the principal lenses 428 now fully occupy the widths $\Omega$ and $\Omega'$ of the two principal zones 441 and 442. Therefore n has the largest value allowed by the above widths and one obtains $$\Omega=nW, \Omega'=n(W+S) \qquad (7)$$

whereas in FIG. 3

$$\Omega<0.6nW, \Omega'<0.6n(W+S)$$

Therefore, for given values of $\Omega$ and $\Omega'$, the number n of principal lenses is now increased by a factor of about 1.7. This increase is made possible by the secondary lenses 427, which are needed in order to substantially reduce in FIG. 4 the higher losses that would otherwise be caused by secondary images.

It will also be shown that the ratio r=N/n is given by $$r \approx \frac{\Omega' - \Omega}{\Omega'} \qquad (8)$$

Therefore, by letting the width W of each lens be an integer multiple of the gap S between adjacent lenses, so that $$\frac{W}{S} = m \qquad (9)$$

one obtains $$r \approx m+1 \qquad (10)$$

and from the above relations one can verify that the router is characterized in view of condition (5) by $$\frac{Q'_0}{Q_0} = 1 - \frac{1}{r} \qquad (11)$$

where $Q_0/Q'_0$ is related to the free-spectral ranges Df and Df' of the two stages since from Equations (3,5)

$$Q_0/Q'_0 = Df'/Df = \Omega'/\Omega$$

As pointed out earlier, r cycles of the first stage are used in FIG. 4. In each cycle of the input stage, the router produces a set of n stationary images, each produced by a particular principal lens, and each set is transmitted to a corresponding set 450 of output waveguides. Moreover, the above n images are all produced by a particular order $Q_i$ of the input stage, as indicated in FIG. 4. The n images are again equally spaced (as in FIG. 3) and their spacing is simply equal to the gap S between adjacent lenses in the principal zone 442.

Moreover, also included in FIG. 4 are two sets of secondary lenses, and an important parameter is the gap $S_0$ between adjacent lenses of different type (principal and secondary). This gap $S_0$ will be shown to determine in the output principal zone 433 the spacing between adjacent images (adjacent output waveguides) characterized by different orders. For this reason, the two gaps S and $S_0$ in FIG. 4 are chosen substantially equal, so that the output waveguides are uniformly spaced. Note, by using r consecutive cycles, the output waveguides fully occupy the width $\Omega'$ of the output principal zone 433, since from relations (6,9,10) one obtains $$\Omega'=n(W+S)=n(m+1)S=nrS=NS$$

As pointed out earlier, the lenses in FIG. 3 are only included in the central regions of the principal zones 341 and 342, since outside these regions each principal zone is characterized by substantial loss caused by secondary images. Instead, in FIG. 4, this loss is substantially reduced by including, between the two stages, secondary lenses located outside the principal zones 441 and 442. This substantially increases n since now the principal lenses can be fully included (as shown in FIG. 4) in the available widths $\Omega$ and $\Omega'$ of the principal zones of the two stages, as implied by relations (7).

Without including the secondary lenses 427, some of the router transmission coefficients in FIG. 4 would be characterized by high losses caused by secondary images. In particular, for the two lenses next to the edges of the principal zones, the losses would be close to 6 dB (of which 3 dB would be contributed by each stage). These high losses only occur, however, when a principal image A is produced in the vicinity of one of the two edges of the principal zone 441. Moreover, the above losses are primarily caused by the secondary image B closest to the principal zone, as shown in FIG. 4. Therefore, they are substantially eliminated by only including one secondary lens, displaced by $\Omega$ from the principal lens receiving the principal image A as shown in FIG. 4. Moreover, in the central regions of the two principal zones the losses caused by secondary images are typically small (a few tenths of dB) and therefore secondary lenses are not included in this case. As a consequence, the required number of secondary lenses is typically less than 60% of the number n of principal images. For instance, in a typical example considered later, $$N=20, n=5, r=4,$$

and only two secondary lenses are needed. Note, on the focal circle 423 of the input stage, each secondary lens is displaced by Ω from the corresponding principal lens. Similarly, on the focal circle 424 of the second stage, each secondary lens is displaced by Ω' from the corresponding principal lens. Also note the size of the router is primarily determined by the widths of the two central zones, and it is not substantially affected by the above secondary lenses.

Note the router of FIG. 4 only includes one input waveguide. In another embodiment, a N×N router performing a total of $N^2$ connections is realized, and in both cases the router satisfies condition (11).

On the other hand, for many applications, one would like the router to be periodic. Then, if the number N of output waveguides is small, it will be shown that a periodic N×N router is best realized by letting n=N and choosing, instead of condition (11)

$$Q_0 = Q'_0. \quad (12)$$

The two stages then have identical properties and, in particular, they have identical frequency periods Df, Df'. The router will then be shown to be periodic and it will produce, at each output waveguide location, a periodic sequence of output stationary images. The i-th period of the router is produced by the i-th cycle of the first stage, and the corresponding orders of the two stages are $$Q_i = Q_0 + i, Q'_i = Q'_0 + i$$

and, because of condition (12), $$Q_i = Q'_i.$$

Each cycle of the router then produces n stationary images whose n locations are the same for all cycles. Therefore the router produces, at each output waveguide location, a sequence of output stationary images, resulting in a periodic sequence of passbands spaced by Df.

Such periodic N×N router is attractive for many applications, since each transmission coefficient includes many (widely spaced) passbands. On the other hand, the router will be shown to require a number n=2N−1 of lenses, and therefore it is only feasible for small values of N, for instance N≦4.

Lens Stepping (Segmentation)

A limitation of the arrangements considered here is the large length of the router. It is therefore important to reduce the router length by improving as follows the design of the lenses between the two stages. The purpose of each lens is to transform each input image produced inside the lens aperture into a corresponding replica, produced on the output aperture. This result could be simply realized by using a conventional lens design, by simply specifying the same optical path length for all waveguides, in which case the output image would be produced without phase errors. Here, instead, it is generally advantageous to reduce the total length of the router by using a different design, making use of the following properties.

1) Typically, the width of the input image only includes three waveguides and therefore, in order for the output image to be accurately produced with negligible loss, it is sufficient to specify less than π/10 errors between adjacent waveguides.

2) Also, the lens performance is not affected if additional phase errors are allowed between adjacent waveguides, provided that the additional errors are substantially equal to integer multiples of 2π, at all the frequencies transmitted by the lens.

3) Finally, the above properties, concerning adjacent waveguides, also apply to the phase errors between each waveguide of a secondary lens and the corresponding waveguide of the principal lens. Thus, the errors between corresponding waveguides are again allowed to include integer multiples of 2π, provided that residual errors are again less than about π/10.

In view of the above properties, since they allow large phase errors, the length of the router can be substantially reduced, particularly if the number of lenses is large. In particular, it is advantageous to use for each lens the following technique, known as lens stepping. Divide the lens aperture in several intervals (segments) and specify nearly zero phase variation (nearly constant optical path) in each segment, but allow between segments phase differences by integer multiples of 2π. A similar technique has been widely used, in the design of dielectric lenses for microwave antennas, to substantially reduce their size and weight. Similarly, here the above technique can substantially reduce the length of each lens, by allowing integer multiples of 2π to be included from each segment to the next (thus changing the optical path lengths of the waveguides by integer multiples of a wavelength). Note a similar technique can substantially reduce the length of a low order grating.

Detailed Derivation

The type of router considered here is characterized by a sequence of cycles, each produced by a particular cycle of order $Q_i$ of the first stage, and by the corresponding cycle of order $Q'_i$ of the second stage, where $$Q_i = Q_0 + i, Q'_i = Q'_0 + i.$$

An important special case is realized by specifying condition (12), so that $$Q_i = Q'_i$$

Figure 5:
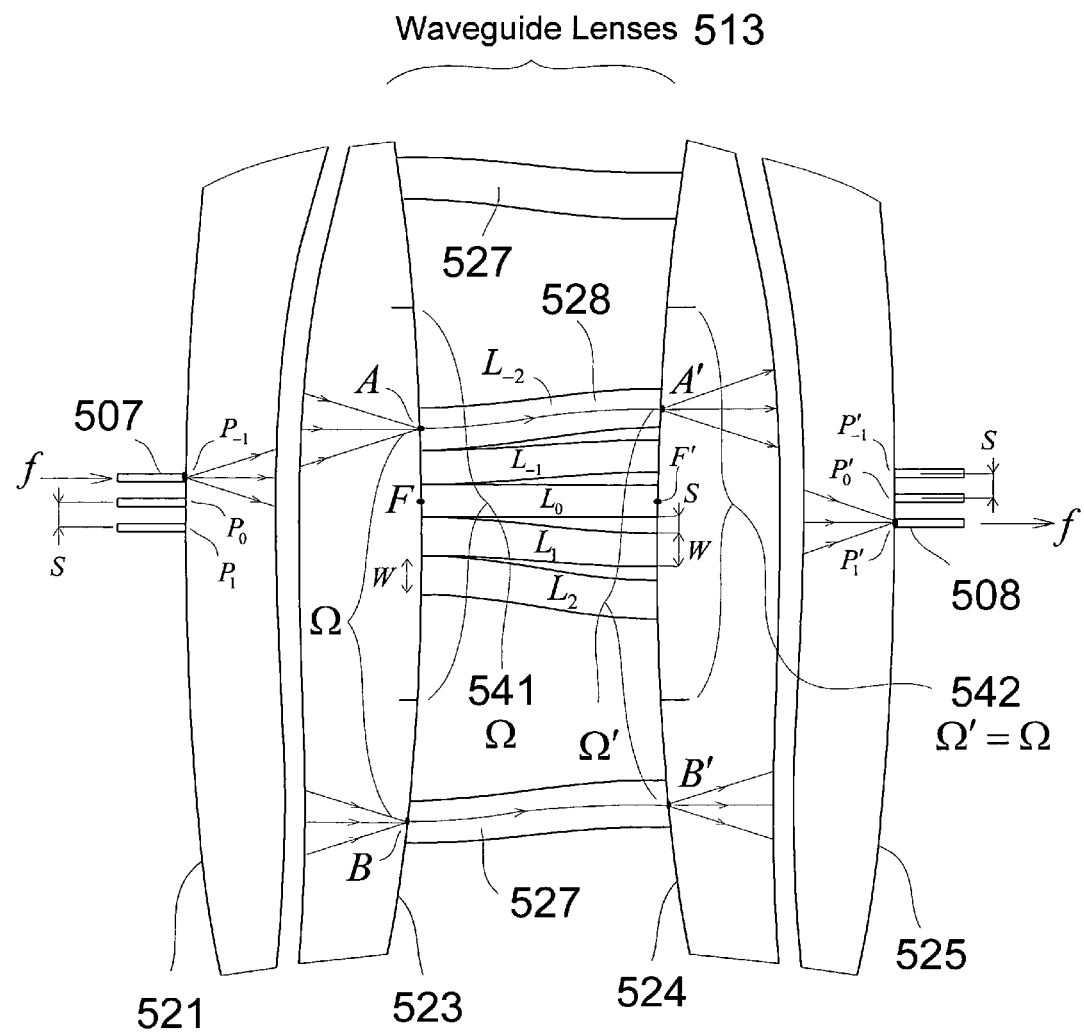
FIG. 5 shows a periodic N×N router realized using two stages having identical diffraction orders.

One can then realize as shown in FIG. 5 a periodic N×N router, performing a total of $N^2$ connections, each produced between two particular waveguides 507 and 508. Moreover, since the router is periodic, each connection is characterized by a set of widely spaced passbands of different orders. Therefore such router has the advantage of allowing simultaneous transmission of widely spaced channels (passbands) in each fiber of an optical network. For instance, in a passive optical network, bidirectional transmission can then be realized, in each fiber connected to the router, by using different periods of the router.

Next, only consider initially the central cycle of order $Q_0$. In order to realize a N×N router, it is shown next that the arrangement of FIG. 3 must be modified by including N−1 additional input waveguides, and a total of 2N−1 principal lenses 528 as shown in FIG. 5 for N=3. In this arrangement, the waveguide locations $P_{-1}, P_0, P_1$ and $P'_{-1}, P'_0, P'_1$ on the input and output focal circles 521 and 525 are equally spaced by S, the principal lenses $L_{-2}, L_{-1}, L_0, L_1, L_2$ have the same width W, and their output apertures are separated by gaps S. Moreover, in addition to the above principal lenses, several secondary lenses 527 are generally included, to reduce the losses caused by secondary images as discussed later. One then obtains the following results.

Figure 6:
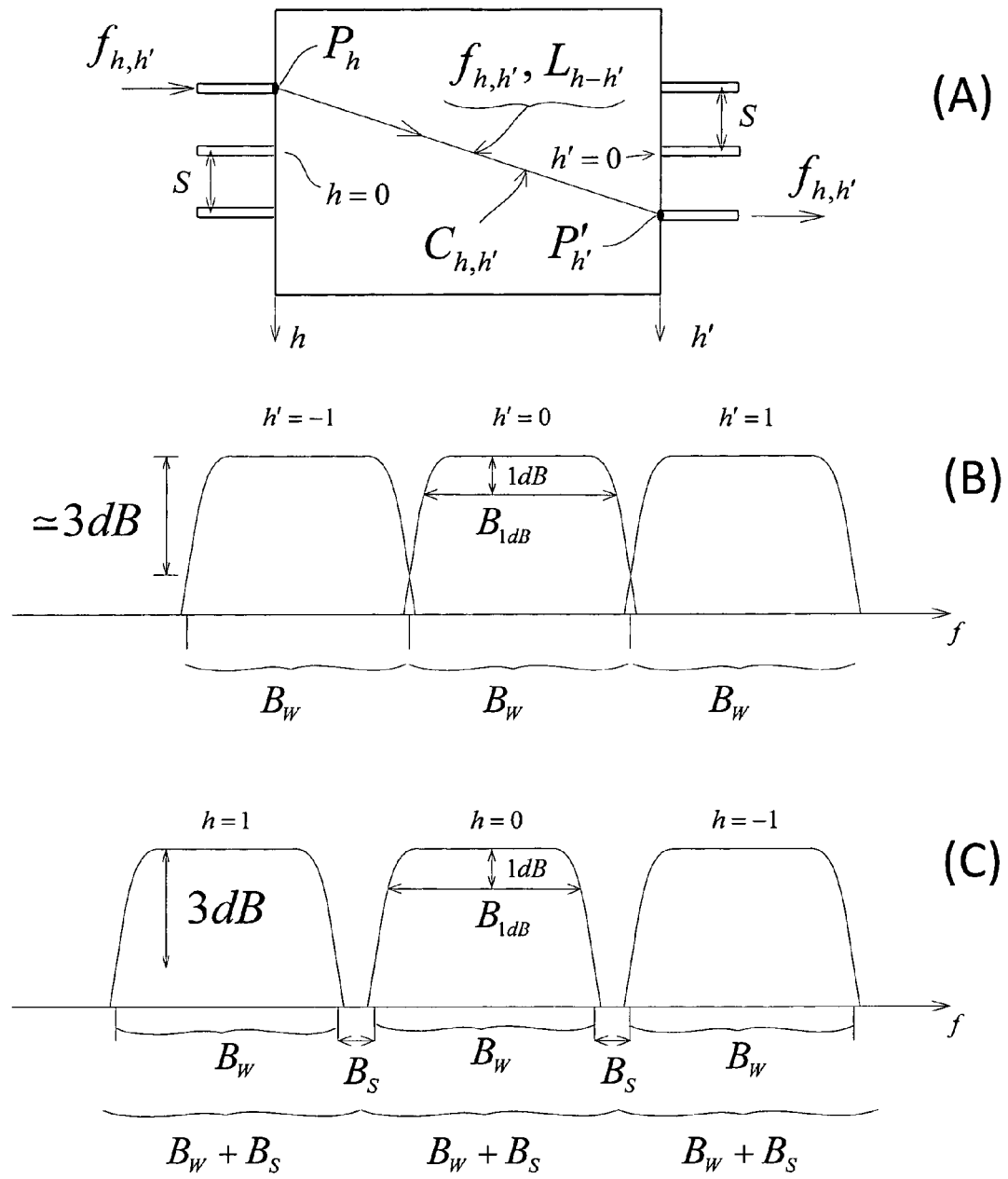
FIG. 6 illustrates the main properties of the periodic router of FIG. 5. As shown by insert (A) each connection is performed by a particular lens $L_{h-h'}$ and it is characterized by center frequency $f_{h,h'}$. The set of passbands (B) produced by a particular input waveguide $P_h$ are closely spaced, with channel spacing equal to $B_W$, whereas the passbands (C) transmitted to a particular output waveguide $P'_{h'}$ are separated by gaps $B_S$.

Each connection, from a particular input location $P_h$ to an output location $P'_{h'}$ is produced by the corresponding principal lens $L_{h-h'}$ as indicated schematically in FIG. 6(A). Moreover, for each connection, the passband width $B_W$ is determined by the lens width W, and the center frequency of the passband is given by $$f_{h,h'} = f_0 - (h-h')B_W - hB_S \quad (13)$$

where $B_S$ is determined by the value of S, $$B_S = \frac{S}{W} B_W \quad (14)$$

and $f_0$ denotes the center frequency of the passband for $h=h'=0$. The above results imply the following properties.

(1) For a particular input waveguide (a particular value of h) the various passbands are spaced by $B_W$. In this case, therefore, the channel spacing is equal to the passband width $B_W$ as shown in FIG. 6(B).

(2) On the other hand, for a particular output waveguide (a particular value of h') the channel spacing is greater than $B_W$, and it is equal to $$B_W + B_S \quad (15)$$

The various passbands are therefore separated by gaps $B_S$ as shown in FIG. 6(C), and each gap $B_S$ is caused by the corresponding gap S between two consecutive lenses in FIG. 5.

(3) The $N^2$ connections performed by the router require a total of 2N−1 principal lenses. More generally, for a M×N router the number of lenses is M+N−1.

(4) In general, if the ratio W/S is chosen arbitrarily, then the above $N^2$ connections require a total of $N^2$ different frequencies (13). It is therefore advantageous to choose the ratio W/S equal to an integer value m, $$W = mS \quad (16)$$

in which case the total number of center frequencies is reduced to m(2N−1) if N is an integer multiple of m.

Figure 7:
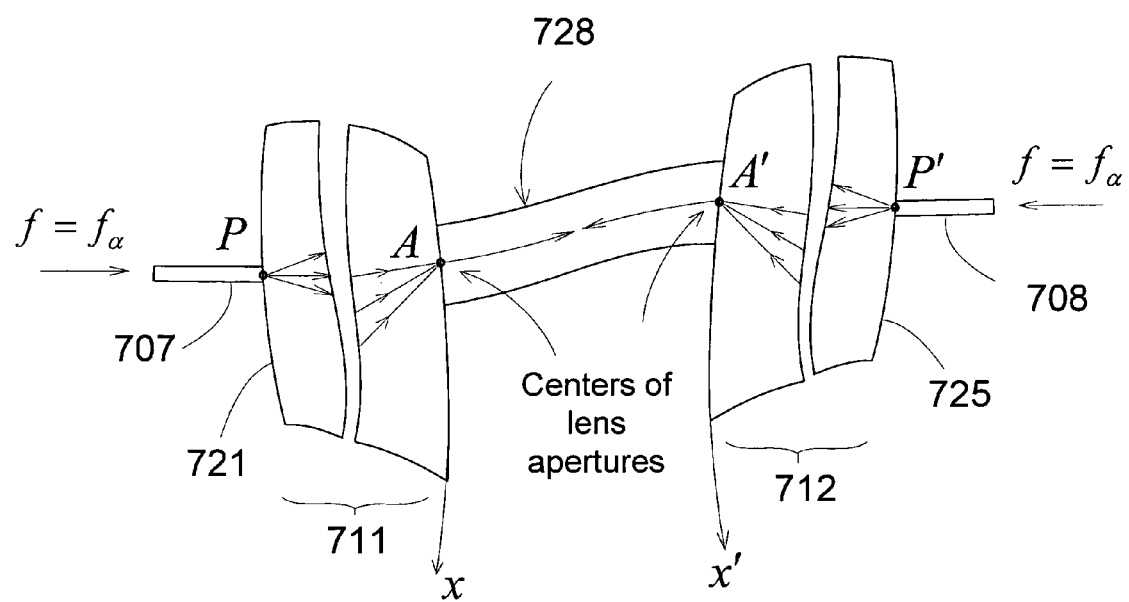
FIG. 7 shows an arrangement of two waveguides 707, 708 two stages 711, 712 and a matching lens 728 located between the two stages. Maximum transmission efficiency at a particular center frequency $f_\alpha$ is realized by centering the lens between the two images A and A' respectively produced by the two waveguides.

The above equations insure maximum transmission at the center frequency of each passband. Then, in order to insure maximum transmission in the entire passband, the router must also satisfy condition (5), which can be derived as follows. Initially ignore in FIG. 5 the secondary lenses 527 connected outside the principal zones 541 and 542, and consider a particular principal lens 528 connected inside the principal zones. In order to maximize the transmission efficiency in a particular passband, produced between two particular waveguides 507 and 508 connected to the router, it is convenient to simultaneously apply the same signal (the same frequency f) to both waveguides, in opposite directions as shown in FIG. 7 where $f_\alpha$ denotes a particular center frequency $f_{h,h'}$. Then, in order to realize maximum transmission, the lens 728 must provide a nearly perfect match between the images A and A' produced (by the two signals) inside the lens apertures. The above equations (13,14) insure a perfect match at the passband center frequency $f_\alpha$, in which case the two images are produced at the centers of the lens apertures as shown in FIG. 7. Then, in order for the two images to match each other in the entire passband, they must have identical derivatives D and D'. For this reason, one must specify at the passband center frequency $$D = D' \quad (17)$$

where D is given by expression (4), and a similar expression applies to D'. One therefore obtains between the widths $\Omega, \Omega'$ of the two central zones the condition (see equation (5))

$$\frac{\Omega'}{\Omega} = \frac{Q_0}{Q'_0} \quad (18)$$

where it is recalled that the ratio $\Omega'/\Omega$ is frequency independent, in view of Equation (1). Once this condition is satisfied, the arrangement will provide between the two waveguides a frequency band of maximum transmission, of width $B_W$ determined by the lens width W. Note, as pointed out previously, condition (18) insures stationary imaging by the router.

For many applications, one would like the router to be periodic. However, the arrangement of FIG. 3 is not generally periodic, even though each stage is periodic. Consider for instance FIG. 7, where the lens perfectly matches two images A and A' produced by simultaneously applying the same frequency $f_\alpha$ to both waveguides, and assume for instance that the two images are respectively of orders $Q_0$ and $Q'_0$. Then, since the first stage 711 is periodic with period Df given by Equation (3), its response to a set of frequencies f+Df, f+2Df, etc is a set of images (of orders $Q_1, Q_2$, etc) all produced at the same location A. Instead, since the period Df' of the second stage 712 is generally different from Df, the response of the second stage to the above set of frequencies (now applied to the second waveguide 708) is a set of images (of orders $Q'_1, Q'_2$, etc) that are displaced from A' by integer multiples of $$(Df' - Df) \frac{W}{B_W}. \quad (19)$$

As a consequence, the images produced by the two stages are substantially mismatched, unless condition (12) is satisfied, $$Q_0 = Q'_0,$$

in which case Df'=Df since from condition (3) one obtains $Df'/Df = Q_0/Q'_0$. Then, a perfect match is realized, between the two images A and A', at all frequencies for which A and A' are produced inside the lens apertures. This arrangement then produces, between the two waveguides, a periodic transmission coefficient characterized by a periodic sequence of passbands spaced by Df and produced by different orders $Q_i = Q'_i$ of the two stages. Moreover, the same result is obtained for all the $N^2$ transmission coefficients in FIG. 5. Therefore such periodic router has the advantage of allowing simultaneous transmission of widely spaced channels in each fiber of an optical network. For instance, in a passive optical network, bidirectional transmission can then be realized, in each fiber connected to the router, by using different periods of the router.

Figure 8:
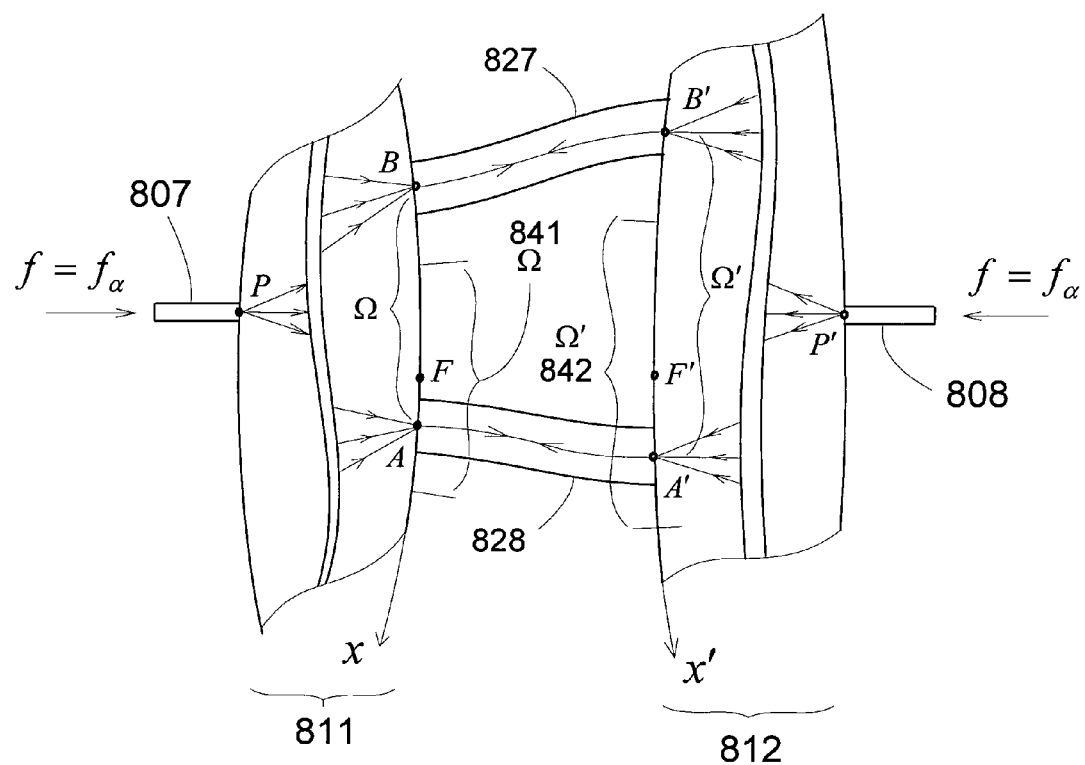
FIG. 8 shows an arrangement consisting of two stages 811, 812, two waveguides 807 and 808, and a principal lens 828 combined with a secondary lens 827.

As pointed out earlier, an important limitation in FIG. 3 is caused by secondary images. These images are undesirable for they reduce the router efficiency, and the resulting loss (which is about twice the loss in dB caused by the individual stages) can exceed 6 dB in the worse case, namely when the two principal images A and A' are close to the edges of the principal zones. For this reason, in FIG. 3 the lenses are only included in the central regions of low loss, and these regions typically cover less than 60% of each principal zone. This is an important limitation in FIG. 3, since it substantially reduces the total number n of lenses for a given size of each stage. In order to increase n, the loss caused by secondary images must be reduced by including secondary lenses as shown in FIGS. 4, 5, 8 and discussed next. Note each of the above figures shows, in addition to the principal images A and A', two secondary images (B and B') and a secondary lens 827 centered between the two secondary images.

The following technique is only needed if a particular principal image is affected by appreciable loss caused by secondary images. The loss in this case is primarily caused by the pair of secondary images B and B' that are closest to the focal points F and F' of the two principal zones, as shown in FIGS. 5, 8. Therefore, the loss is substantially removed by only including one additional lens, with its apertures centered between the two images B and B' as shown in FIG. 8. Note the two images B and B' are respectively displaced by $\Omega$ and $\Omega$ from the principal images A and A', and therefore the secondary lens is similarly displaced from the principal lens 828. Note, in the prior art of FIG. 3, each principal lens only produces one passband. Instead, in the arrangements proposed here, each lens generally produces several passbands, characterized by slightly different values of Ω and Ω'. The difference will however be typically negligible (since the diffraction orders are very large, for the applications considered here) and the optimum location of the secondary lens is simply obtained by using the average value of each displacement Ω and Ω'.

The M×N router of FIG. 5 has the advantage of being periodic. However, it is only suitable for small N, since it requires a total N+M−1 principal lenses. For large N the router design must be modified as shown next, by using a technique that increases the ratio N/n without substantially increasing the size of the router.

Figure 9:
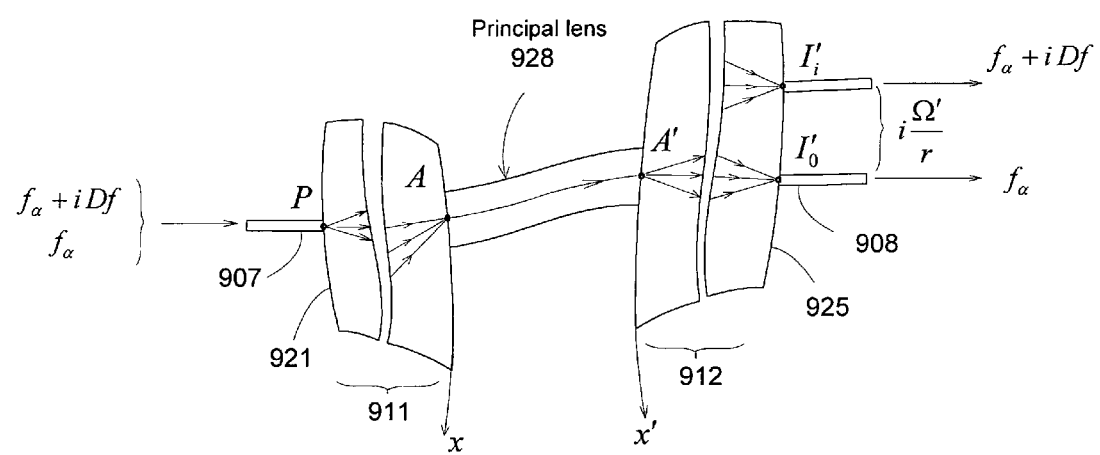
FIG. 9 shows the output images $I'_0$ and $I'_i$ produced by two center frequencies $f_\alpha$, $f_\alpha$+iDf.

Consider again in FIG. 4 the router response to an input signal of variable frequency f applied to a particular input waveguide. Then, each cycle of the router produces a set of n output images and, by choosing $Q_0 = Q'_0$, all sets of different orders are produced at the same n locations. Next, let the total number of output waveguides be increased by instead choosing condition (11), $$\frac{Q'_0}{Q_0} = 1 - \frac{1}{r} \quad (11)$$

and consider the frequency response produced by the router of FIG. 4 to an input signal of variable frequency applied to the input waveguide. First consider the response of order $Q_0$. Then each lens produces a stationary image and therefore, since the number of images is equal to the number n of lenses, n output waveguides are included in FIG. 4 at the locations of the images of order $Q_0$. Next consider FIG. 9 showing a particular lens of the router of FIG. 4. If then $f_\alpha$ denotes the center frequency of order $Q_0$, the center frequency of order $Q_i$ is $$f_\alpha + iDf$$

and, by applying this frequency to the input waveguide 907, the location of the output image A produced on the lens aperture is the same for all orders, since Df is the period of the input stage. On the other hand, because of condition (11), the period Df' of the output stage now differs from Df. Therefore different cycles (different orders $Q'_i$) of the second stage now produce different output images $I'_i$ as shown in FIG. 9, and one can show that $I'_i$ is displaced from the image $I'_0$ of order $Q_0$ by $$i\frac{\Omega'}{r}$$

as indicated in FIG. 9. In this expression the value of Ω' in FIG. 4 is substantially equal to $$\Omega' = n(W+S) + S_0 - S = n(m+1)S + S_0 - S = nrS + S_0 - S \quad (20)$$

and therefore by choosing $S_0 = S$ the spacing of two consecutive images $I'_i$ and $I'_{i+1}$ is equal to $$\frac{\Omega'}{r} \simeq nS \quad (21)$$

which implies to a good approximation that the output waveguides in FIG. 4 are equally spaced by S and that a total of N=nr output waveguides can be included in the principal zone 433 as shown in FIG. 4. More generally, by also including several input waveguides equally spaced by S, a similar result is obtained for each input waveguide. Note, in the example of FIG. 4, each cycle of the router produces a set of n output images, all produced by a particular order $Q_i$ of the input stage. Therefore the output waveguides include several sets 450 characterized by different orders $Q_i$ as indicated in FIG. 4.

Currently, 1×N wavelength routers are widely used in optical networks. Also needed are M×N routers because of their large number MN of connections. Such routers can be realized by including in FIG. 4 one or more sets of input waveguides, with each set including n waveguides spaced by S. Consider for instance a M×N router realized by replacing the input waveguide in FIG. 4 with a set of M=n waveguides spaced by S and again assume $S_0 = S$. Also assume for simplicity an odd number n of principal lenses, so that the lenses include a central lens $L_0$ connected between the foci of the two stages. Let the input and output apertures of the lenses be again arranged periodically (as in FIG. 10 which shows the special case of a N×N router characterized by N=n) and consider a particular connection $C_{h,h'}$. The center frequency $f_{h,h'}$ then produces on the output focal circle of the first stage, a set of images of different orders $Q_i$ as shown in FIG. 2. Moreover, the image of order $Q_0$ is transferred in FIG. 10 to the lens $L_{h-h'}$ and, more generally, the image of order $Q_i$ is transferred to the lens $L_{h-h'+in}$. Therefore, the order $Q_i$ of the principal image produced by $f_{h,h'}$ is specified by the condition $$|h - h' + in| \leq \frac{n-1}{2} \quad (22)$$

obtained by specifying that the corresponding lens $L_{h-h'+in}$ must be inside the two principal zones 1041 and 1042. Note, for each value of h (a particular input waveguide) the i-th cycle of the router produces in general a sequence of n output images, equally spaced by S, as shown for instance in FIG. 4 in the special case of a 1×N router characterized by a single input waveguide with h=0. In this example the router includes r sets 450 of output waveguides, and each set is characterized by a different order $Q_i$.

An important application is a N×N router characterized by N=n. Then, from condition (22), the order $Q_i$ of a particular connection $C_{h,h'}$ is now specified by $$|h - h' + in| \leq \frac{N-1}{2}$$

which can be shown to be the same condition obtained for a conventional N×N router using a single stage of imaging. An advantage of the new router of FIG. 10, as compared to the periodic N×N router considered previously, is that the number n=N of principal lenses is now nearly half the previous number n=2N−1. Moreover, the number of output waveguides can now be substantially increased, by a factor r=m+1 as shown in FIG. 4.

Imaging Errors

The arrangement of FIG. 4 is afflicted for $Q_0 \neq Q'_0$ by small imaging errors. Consider for instance a 1×N router characterized by N=n(m+1) and conditions (7). In this case the appropriate location for each principal lens is determined by simply matching the two principal images A and A' in FIG. 7 at the center frequency of the passband of order $Q_0$. Similarly, each secondary lens is determined by matching the two principal images B and B' in FIG. 8 at the above center frequency. Then, however, the router is afflicted by small imaging errors for all other orders $Q_i$, for two reasons (see conditions 24, 25).

One reason is that, once condition (18) is satisfied in the passband of order $Q_0$ then for the passbands of orders $Q_i$ different from $Q_0$ one obtains, instead of condition (18), $$\frac{D}{D'} = \frac{\Omega' Q_i'}{\Omega Q_i} = \frac{Q_i' Q_0}{Q_0' Q_i} \simeq 1 + \frac{i}{(r-1)Q_0} \quad (23)$$

which differs from unity (thus violating condition (17)) and therefore the output image in this case is not exactly stationary. On the other hand, the resulting image displacement in each passband can be shown to be much smaller (by at least a factor 10) than the waveguide width, provided that $$10\frac{r-1}{4Q_0} < 1 \quad (24)$$

is satisfied. For instance, for N=20, n=5, r=4, λ=1.5 μm and a channel spacing of 200 GHz one obtains $Q_0 \cong 191$ and $$10\frac{r-1}{4Q_0} \simeq 0.04$$

which is entirely negligible.

Next, consider a secondary lens, in which case the following additional error is obtained. Then, once the two images B and B' are matched (so that they have the same coordinates x, x' in FIG. 8) in the passband of order $Q_0$, a passband of different order $Q_i$ is characterized by a mismatch, caused by the difference $$\delta\Omega = (\Omega')_i - (\Omega')_0 - ((\Omega)_i - (\Omega)_0)$$

where $(\Omega')_i$, $(\Omega')_i$ denote the values of $\Omega,\Omega'$ in the passband of order $Q_i$ and the largest error in this case is found to be again negligible provided that $$30\frac{r-1}{4Q_0} < 1 \quad (25)$$

which is again well satisfied in typical applications.

Concluding Remarks

An undesirable feature in FIG. 3 is the large size of the two stages, and this is a consequence of two properties. First, the width W=mS of the lenses is substantially larger than the spacing S of the output waveguides. Second, only a fraction γ of the available field of view (the principal zone width Ω) of each stage is used by the lenses. The second property is a consequence of the lower efficiency (caused by secondary images) outside the central regions (of width γΩ) of the principal zones. Because of the above two properties, only small values of N are feasible in FIG. 3, and this problem is remedied by this patent application by using a combination of two techniques. One technique increases the value of N by a factor m+1 so that $$N=n(m+1)$$

The second technique, increases the ratio γ, so that $$\gamma \cong 1$$

and the resulting loss caused by secondary images is removed by including secondary lenses 427, 527, 827 as shown in FIGS. 4, 5, 8.

Important applications include a M×N router with N=nr, an N×N router featuring for N=n a total of $N^2$ connections, and a periodic N×N router with n=2N−1.

Currently, 1×N routers are widely used in optical networks, and therefore particularly important is the 1×N router of FIG. 4, and the preferred arrangement is that of FIG. 4, where both principal and secondary lenses are included with their output apertures arranged periodically with $S_0=S$. The passbands in this case comprise several sets, which are produced by different diffraction orders, and are transmitted to different sets of output waveguides, and the router in this case is characterized by $$\frac{Q_0'}{Q_0} = 1 - \frac{1}{m+1} \quad (29)$$

which determines the free-spectral ranges of the two stages since $$Q_0/Q_0'=Df'/Df.$$

Figure 10:
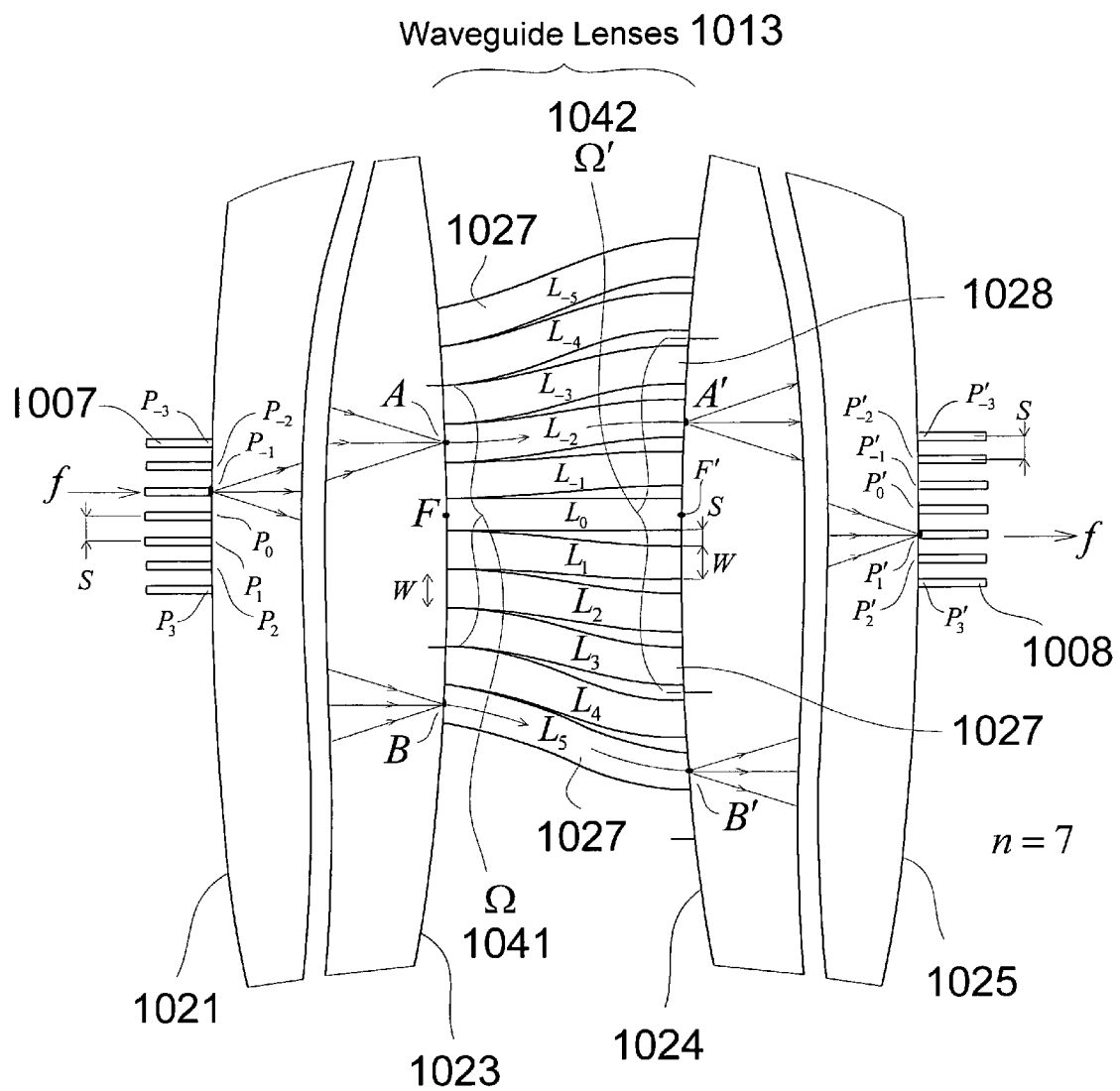
FIG. 10 shows a N×N router with N=n.

On the other hand, for a periodic N×N router, the preferred design is characterized by $$Q_0'=Q_0.$$

and one then obtains FIG. 5. However, this arrangement requires twice the number of lenses as the N×N arrangement of FIG. 10. Therefore FIG. 10, which is characterized by condition (29), is the preferred N×N arrangement if periodic behavior is not needed. A common feature of the above three routers is that the passbands produced by each input waveguide include several sets, produced by different orders of the input stage. In the special case of a N×N periodic router each set is produced by a particular period of the router and it includes N passbands, transferred to the set of N output waveguides. Instead, the router of FIG. 10 is not periodic, and the number of lenses is reduced by about a factor of two by using three diffraction orders $Q_{-1}$, $Q_0$, $Q_1$ of the input stage. Thus, the router in this case comprises three sets of passbands of different orders. Moreover, additional sets can be included, thus increasing the number of waveguides. For instance, the total number of output waveguides can be as large as in FIG. 4 where N=n(m+1). Note in FIG. 4 each set of passbands is transferred to a different set of output waveguides.

In most cases, the preferred arrangement includes secondary lenses. However, secondary lenses are not needed if the principal lenses are only included in the central zone region characterized by maximum efficiency.

In FIG. 4, N has the largest value, $$N \simeq \frac{\Omega'}{S},$$

allowed by the waveguide spacing S. On the other hand, only the central region of the output principal zone 433 is characterized by maximum efficiency. Therefore, in those applications where maximum efficiency is an important requirement, the output waveguides will only be included in the above central region. The maximum width of this region is approximately 0.8Ω' and it is realized by the transitions described in U.S. Pat. No. 6,873,766, issued on Mar. 29, 2005.

Note imaging errors caused by fabrication or design errors will cause the passbands to deviate from the calculated behavior, for instance because of small ripples. Moreover, omitted for simplicity in FIGS. 3, 4, 5, 10 are dummy waveguides, which must be included in the gaps between the output apertures of adjacent lenses, as is well known in the prior art.

In the above arrangements one can show that the maximally flat width $B_{flat}$ of each passband is accurately given in FIG. 6(B) by $$B_{flat} \simeq \left(1 - \frac{1}{m}\right) B_W, \quad (26)$$

whereas the 1 dB width $B_{1dB}$ is slightly wider, $$B_{1dB} \simeq \left(1 - \frac{0.7}{m}\right) B_W. \quad (27)$$

For instance, for m=3, $$B_{flat} \simeq \frac{2}{3} B_W, \quad B_{1dB} \simeq \frac{B_W}{1.3} \quad (28)$$

whereas, for a conventional router, one obtains $B_{flat} \cong 0$ and $$B_{1dB} \simeq \frac{B_W}{4}$$

What is claimed is:

1. A planar optical router comprising two stages of imaging and a number n of principal lenses connected between the principal zones of the two stages;
   the number n is greater than one;
   each stage consists of a waveguide grating performing imaging between the two focal curves of the grating;
   the router includes at least one input waveguide and N output waveguides; wherein:
   the input and output stages have substantially opposite dispersions, so that the router frequency response to an input signal substantially produces a set of N maximally flat passbands;
   said N passbands are respectively transmitted to the N output waveguides; and
   the ratio between the free-spectral ranges of the two stages is properly chosen so that said passbands comprise several sets produced by different orders of the input stage.

2. The planar optical router as recited in claim 1 wherein:
   the number N is greater than n; and
   at least two of the principal lenses are combined with secondary lenses located outside the principal zones of the two stages.

3. The planar optical router as recited in claim 1 wherein:
   the router includes outside the principal zones two sets of secondary lenses;
   the principal set is located between the two secondary sets;
   the output apertures of the principal lenses have substantially constant width W and substantially constant gap width S between adjacent apertures;
   each gap width $S_0$ between adjacent lenses belonging to different sets is substantially equal to S;
   W is an integer multiple of S; and
   the diffraction orders Q and Q' of the first and second stage substantially satisfy the condition $$\frac{Q'}{Q} = 1 - \frac{1}{r},$$

where $r \cong m+1$ and m=W/S.

4. The planar optical router as recited in claim 1 wherein:
   the number of input waveguides is equal to the number N of output waveguides;
   the number n of principal lenses is equal to N;
   the router performs a total of $N^2$ connections; and
   at least two of the principal lenses are combined with secondary lenses located outside the principal zones of the two stages.

5. The planar optical router as recited in claim 1 wherein:
   the lenses are segmented to minimize the total length required between the two stages.

6. A planar optical router comprising two stages of imaging and a number n of principal lenses connected between the principal zones of the two stages;
   the number n is greater than one;
   each stage consists of a waveguide grating performing imaging between the two focal curves of the grating; wherein:
   the router includes a number M of input waveguides and a number N of output waveguides;
   both M and N are greater than one;
   the two stages are characterized by substantially equal free-spectral ranges;
   the router performs a total of MN connections; and
   each connection includes at least two widely spaced passbands whose frequency spacing is substantially equal to the free-spectral ranges of the two stages, and at least two of the principal lenses are combined with secondary lenses located outside the principal zones of the two stages, and at least two of the principal lenses are combined with secondary lenses located outside the principal zones of the two stages.

* * * * *